United States Patent
Huang et al.

(10) Patent No.: US 12,161,246 B2
(45) Date of Patent: Dec. 10, 2024

(54) AIR PREHEATING OF BREW CHAMBER

(71) Applicant: Keurig Green Mountain, Inc., Burlington, MA (US)

(72) Inventors: Jianming Huang, Andover, MA (US); Blair Mikkelsen, Chelmsford, MA (US); Roger Johnson, Burlington, MA (US); Carl Gottfried Kammer, Newton, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 1047 days.

(21) Appl. No.: 16/844,163

(22) Filed: Apr. 9, 2020

(65) Prior Publication Data
US 2021/0315409 A1   Oct. 14, 2021

(51) Int. Cl.
A47J 31/00 (2006.01)
A47J 31/52 (2006.01)
A47J 31/54 (2006.01)
A47J 31/56 (2006.01)

(52) U.S. Cl.
CPC ......... *A47J 31/002* (2013.01); *A47J 31/5253* (2018.08); *A47J 31/545* (2013.01); *A47J 31/56* (2013.01)

(58) Field of Classification Search
CPC ...... A47J 31/002; A47J 31/44; A47J 31/4403; A47J 31/4417; A47J 31/4432; A47J 31/4442; A47J 31/5253; A47J 31/542; A47J 31/545; A47J 31/56; F24H 1/10; F24H 1/105; F24H 1/121; F24H 6/00
See application file for complete search history.

(56) References Cited

U.S. PATENT DOCUMENTS

| | | | |
|---|---|---|---|
| 6,286,415 B1* | 9/2001 | Leung | A47J 31/441 99/290 |
| 2010/0075007 A1* | 3/2010 | Schindler | A47J 31/4485 261/36.1 |
| 2013/0064529 A1* | 3/2013 | Etter | F24H 1/162 219/508 |
| 2013/0180406 A1* | 7/2013 | Hay | A23F 5/04 99/286 |
| 2016/0235242 A1* | 8/2016 | McHugh | A47J 31/407 |
| 2016/0296065 A1* | 10/2016 | Doglioni Majer | A47J 31/5253 |
| 2017/0295992 A1* | 10/2017 | Mangold | A47J 31/467 |

FOREIGN PATENT DOCUMENTS

| | | |
|---|---|---|
| CN | 204306649 U | 5/2015 |
| EP | 0 516 884 A2 | 12/1992 |
| EP | 1 764 014 A1 | 3/2007 |
| WO | WO 2017/214062 A1 | 12/2017 |

OTHER PUBLICATIONS

International Search Report and Written Opinion mailed Jul. 6, 2021 in connection with International Application No. PCT/US2021/026312.

* cited by examiner

*Primary Examiner* — Justin C Dodson
(74) *Attorney, Agent, or Firm* — Wolf, Greenfield & Sacks, P.C.

(57) ABSTRACT

A beverage machine having a heater arranged to receive unheated liquid and deliver heated liquid to a dispensing station to form a beverage, and to receive unheated air and deliver heated air to the dispensing station to preheat portions of the dispensing station before forming a beverage. The machine may be arranged to deliver heated air to the dispensing station only if a temperature at the dispensing station is below a threshold.

22 Claims, 2 Drawing Sheets

AIR PREHEATING OF BREW CHAMBER

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Pat. No. 8,094,998 and U.S. Patent application publication 2017/0307252 disclose other system types in which water in a heater tank is forced to flow out of the tank and to a beverage making station or dispensing location by introducing unheated water into the tank.

SUMMARY OF INVENTION

In accordance with an aspect of the invention, a beverage machine includes a liquid supply arranged to provide a liquid for forming a beverage, e.g., including a water reservoir, a pump to deliver water from the reservoir to other portions of the machine, a controller to control operation of the pump, etc. A dispensing station may be arranged to dispense heated liquid for a beverage using liquid received from the liquid supply, e.g., including a brew chamber arranged to receive and hold a beverage ingredient (such as ground coffee) for mixing with water or other liquid to form a beverage. The machine may include a heater having an inlet to receive liquid from the liquid supply, and an outlet arranged to provide heated liquid to the dispensing station. The heater may also function to deliver only heated air to the dispensing station before a beverage is formed. This may help heat cooled portions of the dispensing station and liquid supply lines between the heater and the dispensing station, and thereby allow the machine to dispense a warmer beverage and/or form the beverage using liquid having a more uniform or otherwise desirable temperature profile.

In one aspect of the invention, a beverage machine includes a liquid supply arranged to provide a liquid for forming a beverage. The liquid supply may include various components, such as a cold water tank or reservoir, a pump to deliver water from the cold water tank, liquid supply lines or other conduits, controllable or non-controllable valves (such as check valves), etc. A dispensing station may be arranged to receive heated liquid for dispensing the beverage. For example, the dispensing station may be arranged to receive and hold beverage ingredients, such as ground coffee, and mix the ingredients with liquid to form a beverage. In some cases, the dispensing station may be arranged as a brew chamber configured to receive a pod or other container holding beverage ingredients. A heater may have an inlet to receive unheated liquid from the liquid supply, and an outlet arranged to provide heated liquid to the dispensing station. Thus, the machine may be capable of forming a beverage using heated liquid, such as water. An air supply may be arranged to provide air to the inlet of the heater, e.g., to purge the heater of liquid and/or cool a pod or brew chamber after a beverage formation cycle is complete, and/or to allow the heater to deliver heated air to the dispensing station to heat portions of the dispensing station, e.g., including beverage ingredients, before forming a beverage. Thus, in some embodiments, the heater is arranged to heat air received from the air supply and provide only heated air to the dispensing station to preheat at least a portion of the dispensing station prior to forming the beverage, and to subsequently provide heated liquid to the dispensing station to form the beverage.

In some embodiments, the machine includes a controller arranged to control the liquid supply, the air supply and the heater to cause the heater to provide heated air only to the dispensing station and to subsequently provide heated liquid to the dispensing station. Thus, a beverage formation cycle may include initially delivering heated air only to the dispensing station, followed by delivery of heated liquid to the dispensing station. Both the air and liquid may be initially unheated and heated by a single heater, such as a flow through heater including a fluid conduit in thermal communication with an electrical resistance heating element. In some cases, the liquid supply includes a pump and the liquid supply is arranged such that the pump selectively pumps liquid to inlet of the heater. The pump may be arranged to selectively pump liquid to the inlet of the heater, or to pump air to the inlet of the heater. Thus, a single pump may be used to provide air or liquid to the inlet of the heater. In other cases, the air supply may include an air pump arranged to pump air into the inlet of the heater.

In some embodiments, a temperature sensor may be arranged to detect a temperature of at least a portion of the heater, and the controller may be arranged to control the liquid supply, the air supply and the heater based on the temperature detected by the temperature sensor. For example, the controller may be arranged to control the air supply and the heater to provide heated air to the dispensing station only if the temperature is below a threshold. Otherwise, air may not be delivered to the heater as part of a beverage formation cycle, and instead heated liquid only may be delivered to the dispensing station. In some cases, the controller may be arranged to purge the heater of liquid after the heater provides heated liquid to the dispensing station. For example, the air supply may include an air pump arranged to pump air into the inlet of the heater, and the controller may purge the heater of liquid by controlling the air pump to pump air into the inlet of the heater. A pod and/or brew chamber may be purged of liquid as well. In some embodiments, delivering air into the inlet of the heater after a beverage cycle is complete may help cool the heater, a pod and/or brew chamber after a beverage cycle is complete.

In one aspect of the invention, a beverage machine includes a liquid supply arranged to provide a liquid for forming a beverage, e.g., like that described above, and a brew chamber arranged to hold a beverage material for mixing with the liquid to form the beverage. A heater may have an inlet to receive liquid from the liquid supply, and an outlet arranged to provide heated liquid to the brew chamber, and an air supply may be arranged to provide air to the inlet of the heater, e.g., to purge the heater of liquid and/or to enable the heater to provide heated air to the brew chamber. A controller may be arranged to control the liquid supply, the air supply and the heater to cause the heater to provide only heated air to the brew chamber prior to forming a beverage only if a temperature at the brew chamber is below a threshold. If the temperature is above the threshold, heated air may not be provided to the brew chamber, and instead heated liquid may be provided without any preheating performed. For example, if the temperature at the brew chamber is above the threshold, the controller may be arranged to cause the heater to provide heated liquid to the brew chamber without providing heated air to the brew chamber. On the other hand, the controller may be arranged to cause the heater to provide heated liquid to the brew chamber to form the beverage after providing only heated air to the brew chamber.

In some cases, the liquid supply includes a pump and the liquid supply is arranged such that the pump selectively pumps liquid to inlet of the heater. The pump may be arranged to selectively pump liquid to the inlet of the heater, or to pump air to the inlet of the heater. Thus, a single pump may be used to provide air or liquid to the inlet of the heater. In other cases, the air supply may include an air pump arranged to pump air into the inlet of the heater.

In some embodiments, a temperature sensor may be arranged to detect a temperature of at least a portion of the heater, and the temperature of at least a portion of the heater may represent the temperature at the brew chamber. In other cases, a temperature sensor may detect a temperature of at least a portion of the brew chamber, such as a portion of a pod or pod holder. The controller may be arranged to control the liquid supply, the air supply and the heater based on the temperature detected by the temperature sensor. For example, the controller may be arranged to control the air supply and the heater to provide heated air to the dispensing station only if the temperature is below a threshold. Otherwise, air may not be delivered to the heater as part of a beverage formation cycle, and instead heated liquid only may be delivered to the dispensing station. In some cases, the controller may be arranged to purge the heater of liquid after the heater provides heated liquid to the dispensing station. For example, the air supply may include an air pump arranged to pump air into the inlet of the heater, and the controller may purge the heater of liquid by controlling the air pump to pump air into the inlet of the heater. The heater may be arranged in different ways, e.g., may be a flow through heater including a fluid conduit in thermal communication with an electrical resistance heating element.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
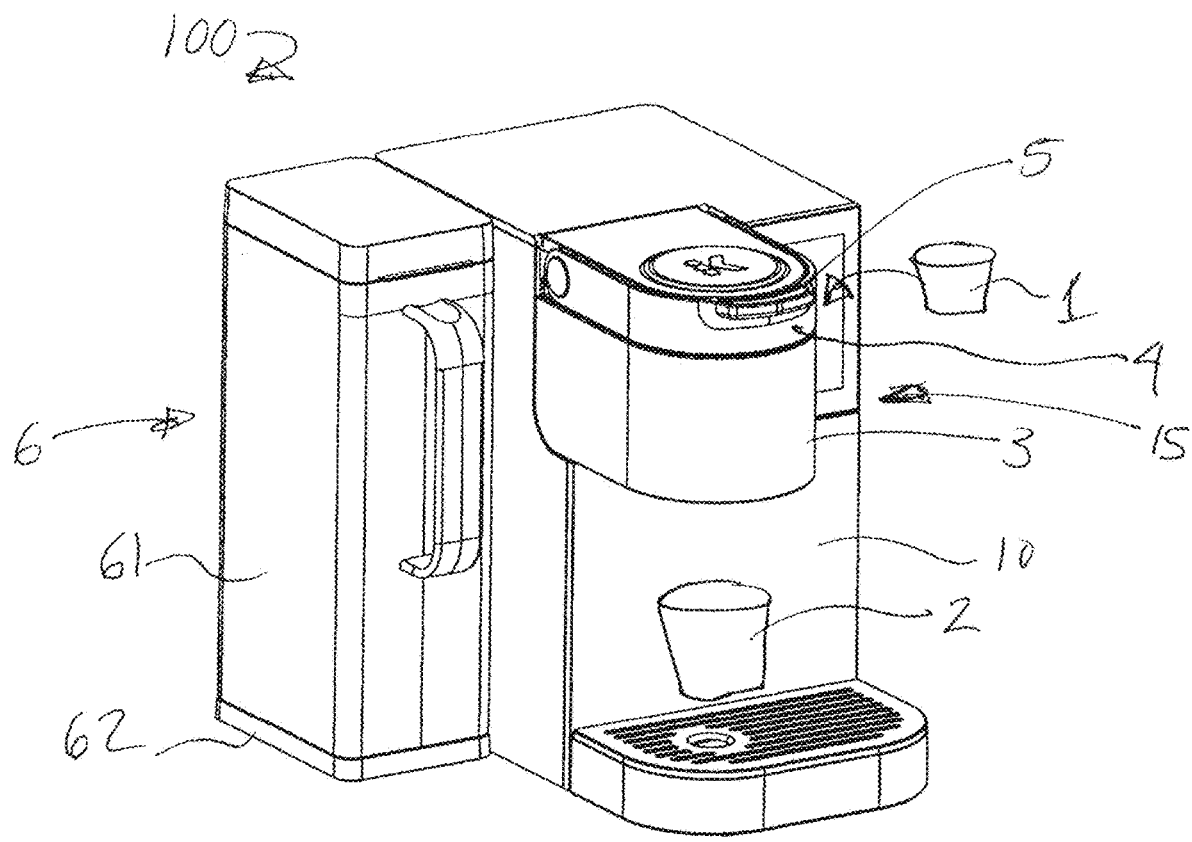
FIG. 1 is a left side perspective view of a beverage forming system in an illustrative embodiment.

FIG. 1 shows a perspective view of a beverage forming system 100 that incorporates features of the invention. Although the beverage forming system 100 may be used to form any suitable beverage, such as tea, coffee, other infusion-type beverages, beverages formed from a liquid or powdered concentrate, soups, juices or other beverages made from dried materials, carbonated or uncarbonated beverages, or other, in this illustrative embodiment the system 100 is arranged to form coffee or tea beverages. As is known in the art, a beverage cartridge 1 may be provided to the system 100 and used to form a beverage that is deposited into a user's cup or other suitable container 2. The cartridge 1 may be manually or automatically placed in a brew chamber 15 that includes a cartridge holder 3 and cover 4 of the beverage forming system 100. For example, the holder 3 may be or include a circular, cup-shaped or otherwise suitably shaped opening in which the cartridge 1 may be placed. With a cartridge 1 placed in the cartridge holder 3, a handle 5 may be moved by hand (e.g., downwardly) so as to move the cover 4 to a closed position (as shown in FIG. 1). In the closed position, the cover 4 at least partially covers the cartridge 1, which is at least partially enclosed in a space in which the cartridge is used to make a beverage. For example, with the cartridge 1 held by the cartridge holder 3 in the closed position, water or other liquid may be provided to the cartridge 1 (e.g., by injecting the liquid into the cartridge interior) to form a beverage that exits the cartridge 1 and is provided to a cup 2 or other container. Of course, aspects of the invention may be employed with any suitably arranged system 100, including drip-type coffee brewers, carbonated beverage machines, and other systems that deliver water or other liquid to form a beverage. Thus, a cartridge 1 need not necessarily be used, but instead the brew chamber may accept loose coffee grounds or other beverage material to make a beverage. Also, the brew chamber 15 need not necessarily include a cartridge holder 3 and a cover 4. For example, the brew chamber may include a filter basket that is accessible to provide beverage material (such as loose coffee grounds), and the filter basket itself may be movable, e.g., by sliding engagement with the beverage machine 10 housing, and a cover 4 may be fixed in place. In other embodiments, the brew chamber need not be user accessible, but instead beverage material may be automatically provided to, and removed from, the brew chamber. Moreover, the system 100 need not have a brew chamber 15, but instead other types of dispensing stations, e.g., that dispense hot and/or cold water (whether still or carbonated) at an outlet such as a dispensing nozzle without mixing with any beverage ingredient. Accordingly, a wide variety of different types and configurations for a dispensing station may be employed with aspects of the invention.

Figure 2:
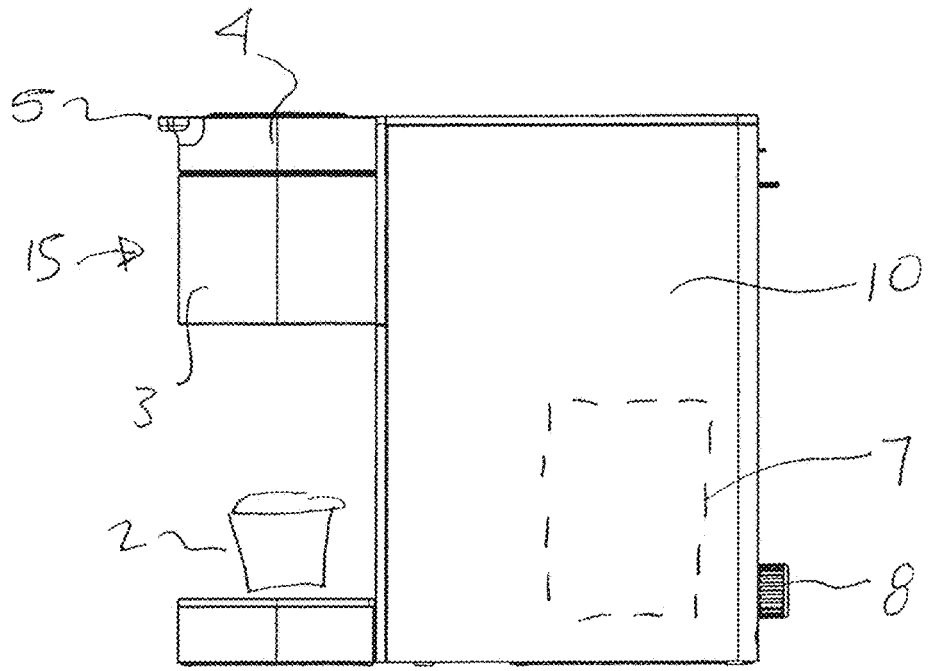
FIG. 2 is a right side view of the beverage forming system in FIG. 1.

As shown in FIGS. 1 and 2, liquid from either an external reservoir 6 or an internal reservoir 7 may be provided to a brew chamber 15 or other dispensing station to dispense a beverage. For example, a user may pour or otherwise provide water to an external reservoir 6, which may then be delivered to the brew chamber 15 or other dispensing station to form a beverage. Alternately, liquid may be provided from an internal reservoir 7 as shown in FIG. 2 to the brew chamber 15. The internal reservoir 7 may be provided with liquid from a mains water connection 8 which allows the machine 100 to be connected to a plumbed water source, such as a so-called city water or mains water supply. Such a supply is typically under pressure, and thus the mains water connection 8 may be configured to receive water at relatively high pressure, such as 60 psi or more. The internal tank 7 may be fluidly coupled to the mains water connection 8 so that water can be delivered to and stored by the internal tank 7 for delivery to the brew chamber 15. In some embodiments, the internal tank 7 may optionally be provided with liquid by a user, e.g., by pouring the liquid through an opening in the beverage machine housing 10 into the internal tank 7. Both reservoirs 6, 7 need not be provided, however, and instead the beverage machine 100 may have only an external reservoir 6 or internal reservoir 7.

By arranging the beverage machine 100 with the ability to provide water from either an external reservoir 6 or an internal reservoir 7, a user may have different options for configuring the machine 100 in different environments. In some cases, a user may wish to use liquid in the external reservoir 6 for some beverages, and use liquid in the internal reservoir 7 for other beverages. City water in the internal reservoir 7 may be used for flavored beverages, while specially filtered or otherwise treated water in the external reservoir 6 may be used for other beverages, as merely one example. A user may manually operate a valve to switch between the reservoirs 6, 7, or may interact with another user interface component, such as a button or touch screen icon, that causes a controller to adjust the valve to supply liquid from a selected reservoir 6, 7. In this embodiment, the external reservoir 6 includes a tank 61 which is removable from a tank base 62, e.g., to allow the tank 61 to be more easily filled with water. The tank base 62 may additionally be removable from the housing 10 if the external reservoir 6 is not used.

Figure 3:
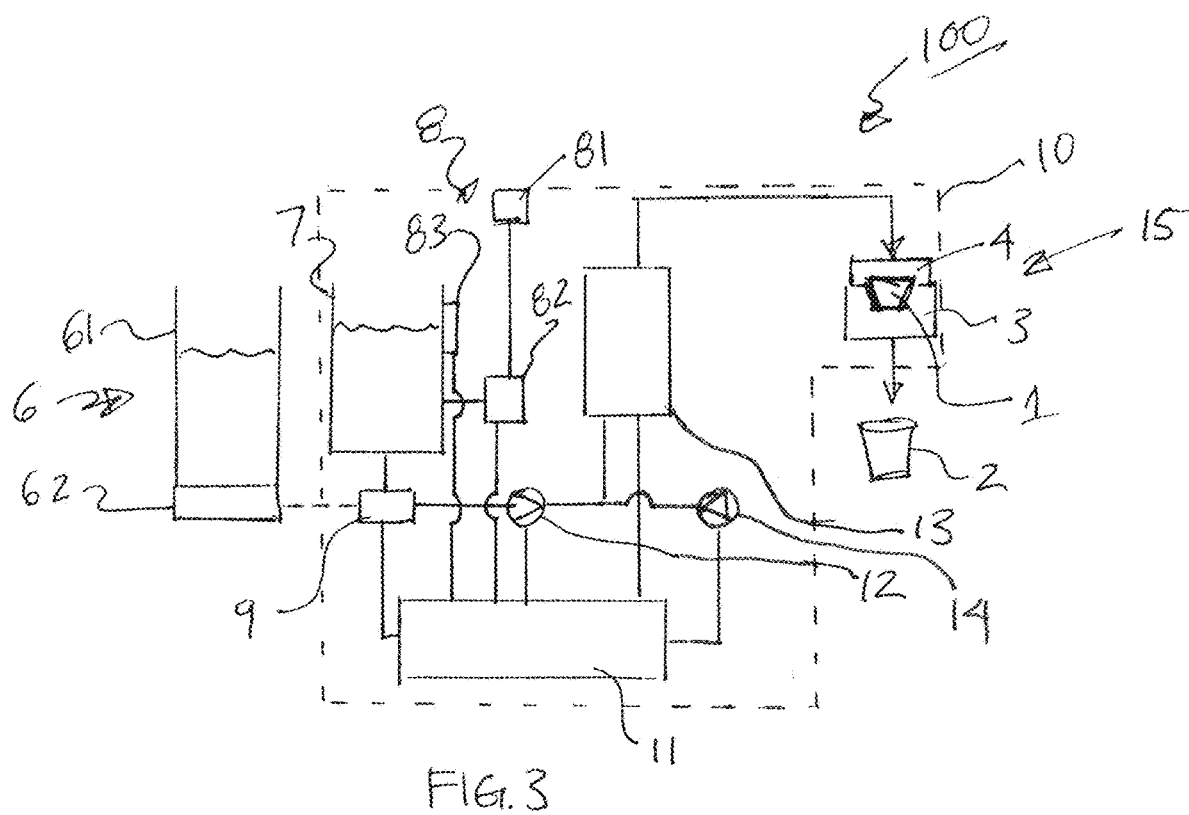
FIG. 3 shows a schematic diagram of functional components of the beverage forming system in an illustrative embodiment.

FIG. 3 shows a schematic diagram of a liquid supply and other components of a beverage machine 100 for handling liquid used to make a beverage. As noted above, the liquid supply of the machine 100 in this embodiment includes an external reservoir 6 and an internal reservoir 7. In this arrangement, the mains water connection 8 includes a connector 81 configured to fluidly connect to a hose, pipe, tube, fitting or other component that provides mains water to the connector 81, a mains valve 82 that controls flow of mains water to the internal reservoir 7 and a level sensor 83 to detect a liquid level in the internal reservoir 7. The mains valve 82 can be controlled by a controller 11 based on information from the liquid level sensor 83, e.g., the mains valve 82 can be opened to allow flow until the level in the internal reservoir 7 reaches a particular level, at which point the mains valve 82 is closed to flow. The internal reservoir 7 may be vented to hold liquid at ambient pressure, allowing the internal reservoir 7 to be made less robustly since the reservoir 7 need not be arranged to withstand the pressure of the mains water supply.

A distribution valve 9 can selectively couple either of the reservoirs 6, 7 to the brew chamber 15 or other dispensing station arrangement for delivery of liquid. The distribution valve 9 may be controllable, such as manually by a user or electronically by a controller 11, to select between the external reservoir 6 and internal reservoir 7. For example, the distribution valve 9 may have a knob, button, slider or other user actuable element on the housing 10 that can be pressed, turned or otherwise actuated to select between the reservoirs 6, 7, i.e., to select which reservoir 6, 7 will provide liquid to form a beverage. Where the valve 9 is electrically actuable, the user actuable element may include an electronic switch or other user interface component that provides information to the controller 11, which may control the valve 9 accordingly. Alternately, the controller 11 may automatically control the valve 9 based on other information, such as beverage formation parameters defined by a type of beverage to be made. For example, as described more below, the valve 9 or another valve may couple not only the reservoirs 6, 7 to a pump 12, but also an air source to the pump 12 to allow the pump 12 to deliver air to the inlet of the heater 13. In embodiments where only one reservoir 6, 7 is provided, the valve 9 is not required and can be eliminated. Beverage parameters may be set by default by the controller 11, by a user interacting with a user interface, and/or by reading a machine readable feature on a cartridge 1 and using corresponding parameters.

In this embodiment, the liquid supply of the machine 100 includes a pump 12 which pumps liquid from the valve 9 to the inlet of a heater 13. Employing a pump 12 may allow the machine 100 to vary a flow rate and/or pressure of the liquid as desired, e.g., to form espresso-type or other beverages using higher pressure liquid as well as drip-type coffee or other beverages made using lower pressure liquid. In this embodiment, the pumping of water or other liquid into the heater 13 causes heated liquid to flow to the brew chamber 15 or other dispensing station. Heated liquid is delivered to the brew chamber 15 for mixing with a beverage medium (or not) and for dispensing as a beverage.

In accordance with an aspect of the invention, the heater can be employed to both receive and heat unheated liquid to deliver heated liquid to the brew chamber 15 as well as to provide heated air to the brew chamber 15. Some users of hot drinks machines find that the drinks are not dispensed as hot as they would like. This can be caused by various factors, such as heat loss to the user's cup, heat loss to a brew chamber, coffee grounds or other beverage material, or other relatively cool components of the beverage machine. Immediately after a hot beverage is dispensed, portions of a beverage machine downstream of the heater 13 may be relatively warm and thus allow the machine to dispense a hotter beverage that would be possible if the machine had been idle for several hours. That is, after use, a beverage machine will cool, including parts of the brew chamber and lines that deliver heated liquid from the heater to the brew chamber. Moreover, beverage materials, whether provided loose or in a pod, will be cool unless stored in heated conditions. As a result, it may be difficult or impossible for a beverage machine to dispense an optimally heated beverage. However, in accordance with aspects of the invention, a beverage machine can preheat a brew chamber and/or other portions of the machine before liquid is delivered to the brew chamber to form the beverage. Preheating can be done using hot air, which heats beverage machine portions without forming a beverage. Once preheating is complete, i.e., portions downstream of a heater including a brew chamber are suitably warm, heated liquid can be provided to the brew chamber to form the beverage. This way, a hot beverage can be dispensed regardless of how long a beverage machine has been idle.

In some embodiments, a single heater may be used to provide both heated air for preheating as well as heated liquid for beverage formation. This can help simplify operation of the machine, as well as reduce a number of components needed to provide the preheat and heated liquid functions. For example, a flow through heater may have an inlet to which air and/or liquid are provided. A pump may deliver air or water to the heater inlet, allowing the heater to deliver heated air or liquid to the brew chamber. In some cases, a single pump may be used to deliver either air or liquid to the heater, or separate liquid and air pumps may be used to respectively deliver liquid and air to the heater.

In some embodiments, preheating with heated air may only be employed if a temperature of the brew chamber or other machine portion is below a threshold. Otherwise, the machine may deliver heated liquid to a brew chamber to form a beverage without air preheating. For example, if a machine has recently been used to form multiple hot beverages, air preheating may be unnecessary or ineffective, and thus not used. However, if the machine has been idle for several hours, or recently used to dispense a cool or unheated beverage, air preheating may be employed before dispensing a hot beverage. A temperature sensor may be used to detect a temperature indicative of the brew chamber, e.g., by a sensor located at the brew chamber, at a portion of a liquid delivery line between the heater and the brew chamber, and/or at a portion of the heater. For example, if a temperature of a portion of the heater is below a threshold, it may be presumed that the brew chamber and other parts downstream of the heater are relatively cool as well, and in response, air preheating may be employed. Other criteria may be used to decide whether to employ air preheating, such as a time since the last beverage dispense, a temperature of a beverage last dispensed, or a user's command input to the controller indicating that preheating should be employed.

In the embodiment of FIG. 3, hot air for preheating the brew chamber 15 is provided by an air pump 14 that delivers air into the inlet of the heater 13. That is, both the air pump 14 and the pump 12 are fluidly coupled to the inlet of the heater 13 so that either air or liquid may be selectively provided to the inlet of the heater 13. Note, however, that separate air and liquid pumps need not be used, and instead a single pump may be employed to provide both air and liquid to the heater 13. For example, the pump 12 may be arranged to deliver either air or water, and may have an additional inlet to provide air to the pump 12. One or more controllable valves may be used to control whether air or water is delivered to the pump inlet so that air or liquid can be selectively provided to the inlet of the heater 13. As an example, the valve 9 may additionally be coupled to an air source, such as ambient air, and the valve 9 may be controlled by the controller 11 to provide air to the inlet of the pump 12 so that the pump 12 can pump air into the inlet of the heater 13. In another example, a supply line coupled between a reservoir 6, 7 and the pump 12 may be routed from the outlet of the reservoir 6, 7 to a location above a maximum water level on the reservoir 6, 7 and then to the pump 12. A valve may be located at a location of the supply line above the maximum water level, and be arranged to be controllably opened and closed (e.g., by the controller 11) to admit (or not) air into the supply line. Thus, when the valve is open, air may be introduced into the supply line so the pump 12 can pump air. When the valve is closed, air cannot enter the supply line and the pump 12 pumps water.

Where separate air and water pumps are used, one or more check valves or other valves or flow control elements may be used to prevent air or liquid from traveling in an undesired direction, e.g., to prevent liquid from entering the air pump or air from entering the liquid pump. For example, the outlets of the pump 12 and the air pump 14 may include check valves to prevent air and water, respectively, to flow in a reverse direction into the pump 12, 14. The controller 11 may control the heater 13 to operate to heat air that is delivered to the heater 13 so that suitably warm air is delivered from the heater 13 to downstream components including the brew chamber 15. The hot air may heat fluid lines, and other parts such as portions of the brew chamber that hold beverage ingredients mixed with liquid to form a beverage. If beverage ingredients are provided to the brew chamber in a pod, hot air may be delivered into the pod to heat not only beverage ingredients but also the pod container and other structure along with beverage outlet conduits. For example, the brew chamber may include inlet and outlet needles that pierce the pod to form inlet and outlet openings to deliver liquid into the pod and allow beverage to exit the pod. Hot air may pass through the pod and into the outlet needle and downstream beverage dispensing components that lead to a user's cup. Thus, all portions of the beverage machine downstream of the heater that contact a beverage or liquid used to make a beverage may be preheated with heated air. In addition, heated air exiting the brew chamber may be directed into the user's cup 2 to help preheat the cup 2.

Heated air may be delivered to preheat components to a desired level. For example, the air pump 14 may deliver air to the heater 13, and heated air may be provided to the brew chamber 15 for a period of time, or a particular volume of heated air may be caused to flow through the brew chamber. In some embodiments, the brew chamber or other components may be associated with a temperature sensor that detects when components have been suitably heated, at which point the controller 11 may stop heated air flow for preheating. Thereafter, the controller 11 may cause the pump 12 to deliver liquid to the heater 13 so that heated liquid may be delivered to the brew chamber to form a beverage.

As noted above, the controller may be arranged to deliver preheating air to the brew chamber only if a temperature at the brew chamber is below a threshold temperature. For example, the controller 11 may include a temperature sensor that detects a temperature indicative of a temperature in the brew chamber. In some cases, the temperature sensor may be associated with the brew chamber itself or other portions of the machine that carry heated water to the brew chamber, such as at a portion of the heater 13, a water delivery line, etc. For example, a temperature at a portion of the heater 13 may indicate that the heater 13 is below a threshold temperature, and thus that the brew chamber temperature is also below a threshold (which may be different than the heater threshold temperature). If the temperature sensor indicates that the temperature is below a threshold, the controller 11 may cause air preheating to be performed. If, however, the temperature is above the threshold, air preheating may not be needed and so not performed for a beverage formation cycle. Instead, the controller 11 may cause water to the delivered to the heater 13 for subsequent heating and delivery to the brew chamber to form a beverage without air preheating.

Once liquid delivery is complete to form the beverage, the controller 11 may control the heater, air pump and/or liquid pump to purge the heater and/or downstream components of liquid. This may help with later preheating of the brew chamber, if needed. For example, if water is permitted to remain in the heater 13 and downstream delivery lines after a beverage formation cycle is complete, the water may cool as the machine sits idle. For water downstream of the heater, there may be no way to reheat the water, and thus the cool water may be delivered to the brew chamber in a next beverage cycle. This, of course, may cause the dispensed beverage to have a lower temperature than desired. However, by purging delivery lines of water after each beverage cycle, no water may remain in the heater, delivery lines or brew chamber. As a result, if air preheating is used prior to dispensing a subsequent beverage, only heated air may be delivered to the brew chamber, thereby aiding in the dispensing of a suitably heated beverage. Purging may be done in different ways, or combinations of ways. For example, the heater 13 may be operated to vaporize liquid in the heater 13, e.g., to create steam which forces liquid out of downstream lines from the heater 13 and from the brew chamber. In addition, or alternately, air may be delivered into the heater 13 or elsewhere upstream of the brew chamber to help push liquid out of delivery lines and other brewer portions. As an example, after liquid delivery from the heater 13 is complete, the air pump 14 may be operated to purge the heater 13 and downstream conduits, the dispensing station, etc. of liquid. The controller 11 may operate the air pump 14 for a particular amount of time, or volume of air to control the extent of purging. Air may be delivered into the heater 13 inlet after beverage formation is complete for other reasons as well, such as cooling the heater 13, other liquid delivery components, a cartridge 1 and/or portions of a brew chamber.

It should be appreciated that the beverage machine 100 may include different components than those shown in FIG. 3 and/or may operate in different ways. The pump 12 may be any suitable type of pump, such as a centrifugal pump, piston pump, solenoid pump, diaphragm pump, etc. Although not shown, a check valve or other flow controller (such as an electronically-controlled valve) can be used to prevent backflow or other flow in a conduit between the pumps 12, 14 and the heater 13, and/or the heater 13 and the brew chamber 15. A pressure relief valve may be used to vent any suitable section of the liquid conduit between the reservoirs 6, 7 and the brew chamber 15, e.g., in the case of pressure over a threshold level. In some embodiments, the pump 12 may pump air through the liquid conduit, e.g., to purge the liquid conduit, heater 13 and/or brew chamber 15. In such a case, a valve may be provided to permit air flow to the pump 12, e.g., the distribution valve 9 may have an air inlet to selectively connect the inlet of the pump 12 to an air supply.

Operation of the pump 12, heater 13 and/or air pump 14, and other components of the machine 100 may be controlled by the control circuit 11, which may include a programmed processor and/or other data processing device along with suitable software or other operating instructions, one or more memories (including non-transient storage media that may store software and/or other operating instructions), temperature and liquid level sensors, pressure sensors, input/output interfaces (such as a user interface on the housing 10), communication buses or other links, a display, switches, relays, triacs, or other components necessary to perform desired input/output or other functions. A user interface may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on. As noted above, a user may provide input to the control circuit 11 to indicate that air preheating should be used as part of a particular beverage formation cycle.

The heater 13 and/or the brew chamber 15 may be provided with a desired amount of liquid and/or air by any suitable technique, such as running the pump 12, 14 for a predetermined time, detecting a flow rate or volume of liquid passing through the pump (e.g., using a flow meter), operating the pump 12, 14 for a desired number of cycles (such as where the pump is arranged to deliver a known volume of fluid for each cycle, such as for each revolution of a pump shaft), or using any other viable technique. Alternately, the heater, such as a heater may be determined to be completely or otherwise suitably filled when a pressure sensor (not shown) detects a rise in pressure indicating that the water has reached the top of the heater, when a conductive probe detects the presence of liquid in an upper portion of the heater, when an optical sensor detects a presence of liquid in the heater, and others.

Liquid may be introduced into the cartridge 1 or brew chamber 15 at any suitable pressure, e.g., 1-2 psi or higher, and the pressure may be adjustable by the control circuit 11. The brew chamber 15 may include any beverage making ingredient or material, such as ground coffee, tea, a flavored drink mix, or other beverage medium, e.g., contained in a cartridge 1 or not. Alternately, the brew chamber 15 may function simply as an outlet for heated water, e.g., where a beverage medium is contained in a user's cup 2. Once liquid delivery by the pump 12 is complete, an air pump may be operated to force air into the brew chamber 15 and/or other portions of the liquid conduit to help remove liquid.

While in this illustrative embodiment, a liquid supply system arranged to provide liquid to a beverage outlet (at the brew chamber 15) may include a pump 12, other arrangements may be used. Alternately, other mechanisms for providing liquid may be used, such as by gravity flow of liquid, flow forced by air pressure, or other motive force to move liquid from a reservoir 6, 7, such as pressure from a mains water supply, and others. For example, the air pump 14 may be used to pressurized the internal tank 7 to force liquid to flow into the heater 13 and to the brew chamber 15. Thus, the air pump 14 may be used to move liquid and air in the system.

For those systems employing a cartridge 1, once a cartridge is located in the brew chamber 15 in the closed position, the beverage forming system 100 may use the cartridge 1 to form a beverage. For example, one or more inlet needles associated with the cover 4 or other part of the system 100 may pierce the cartridge 1 (e.g., a lid of the cartridge) so as to inject heated water or other liquid into the cartridge 1. The injected liquid may form the desired beverage or a beverage precursor by mixing with beverage material in the cartridge 1. The cover 4, cartridge holder 3 or other portion of the system 100 may also include one or more outlet needles or other elements to puncture or pierce the cartridge 1 at an outlet side to permit the formed beverage to exit the cartridge 1. Other inlet/outlet piercing arrangements are possible, such as multiple needles, a shower head, a non-hollow needle, a cone, a pyramid, a knife, a blade, etc. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, a lid or other portion of a cartridge may be pierced, or otherwise effectively opened for flow, by introducing pressure at an exterior of the lid. For example, a water inlet may be pressed and sealed to the lid exterior and water pressure introduced at the site. The water pressure may cause the lid to be pierced or otherwise opened to allow flow into the cartridge 1. In another arrangement, the cartridge lid may include a valve, conduit or other structure that opens when exposed to a suitable pressure and/or when mated with a water inlet tube or other structure. As with the inlet piercing arrangement, the outlet piercing arrangement may be varied in any suitable way. Thus, the outlet piercing element may include one or more hollow or solid needles, knives, blades, tubes, and so on. Alternately, the cartridge 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element remains in place to receive beverage as it exits the opening formed in the cartridge. However, in other embodiments, the piercing element may withdraw after forming an opening, allowing beverage to exit the opening and be received without the piercing element being extended into the cartridge 1. Other arrangements for a beverage outlet are possible however, e.g., the cartridge may have a permeable portion that allows beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

With a beverage cartridge 1 provided in the brew chamber 15 or beverage material (if used) otherwise provided with the brew chamber 15, the control circuit 11 may operate in different ways to dispense a beverage. In some embodiments, the control circuit 11 may automatically select one or more brew parameters for automatically controlling the liquid supply and heater tank portions to dispense a beverage during a dispensing operation. For example, the control circuit 11 may select default values for parameters such as a beverage volume, beverage temperature, whether beverage frothing or whipping will be employed, a beverage dispense time or speed, a precursor liquid flow rate, a precursor liquid pressure, whether beverage chilling will be employed, whether brew chamber air or steam purge will be employed, whether beverage material pre-wet or pulse-type brewing will be employed and if so time periods between liquid delivery, whether air preheating will be performed, and others. Such parameters may be automatically determined in different ways, such as by reading parameter values from an information element (such as an RFID tag) on a cartridge 1, receiving input from a user via a user interface such as by the user pressing a button or otherwise indicating a parameter, by employing default values stored in a memory of the control circuit 11, and/or by a combination of such techniques or others. In some cases, the control circuit 11 may begin a dispensing operation once the brew parameter values are set, or in response to additional user input such as the user pressing a brew start button. In one example, a user may press one of several beverage volume buttons to select a beverage volume, and then press a brew start button to cause the control circuit 11 to start an automated dispensing operation. Parameters used to dispense a beverage may be set by default by the control circuit 11 and/or by input from the user. For example, other brew parameters such as beverage temperature, etc. may be automatically selected by the control circuit 11 using default values unless the user provides additional input to adjust those values.

The control circuit 11 may execute an automated dispensing operation (in this example in response to depression of the start button) in different ways since dispensing processes may include different steps which may be performed in series and/or in parallel. For example, in some embodiments a heater may store a volume of pre-heated water such that the control circuit 11 may immediately control the pump 12 to deliver additional water to the heater, thereby causing the flow of heated water from the heater tank to the brew chamber 15 at the start of a dispensing operation. In this case, air preheating may be done by delivering air into the heater water or through a heat exchanger in the heater so that the air is heated and delivered from the heater to the brew chamber. In other embodiments, water in the heater may first need to be heated, and thus the control circuit 11 may first cause a heating element to heat water in the heater, and then automatically start water delivery (or air preheat) once heating is complete. Of course, other beverage machine 100 configurations may involve other steps at part of an automated dispensing operation. For example, if the beverage machine 100 employs an inline or flow through heater as a heater, the control circuit 11 may cause a heating element of the inline heater to begin heating and then simultaneously or shortly thereafter begin causing water or air flow through the inline heater and to the brew chamber. A flow through heater may include a fluid conduit that is in thermal communication with an electrical resistance heater that serves to heat the fluid conduit and fluid in the conduit. Where no pump is used by the beverage machine 100, water flow may be caused by gravity, steam pressure in an inline heater, or other.

With water or other liquid sufficiently heated in the heater, the control circuit 11 may continue with the automated process of beverage dispensing by causing the pump 12 to deliver liquid to the heater, thereby delivering heated liquid to the brew chamber 15. The control circuit 11 may sense or otherwise keep track of a volume of liquid delivered to the brew chamber 15 so that the appropriate beverage volume can be dispensed. For example, the control circuit 11 may cause the pump 12 to operate a specified number of cycles where a particular volume of liquid is delivered by the pump 12 for each pump cycle. Alternately, a flow meter may be used by the control circuit 11 to detect a volume of liquid delivered to the brew chamber 15, or other techniques.

While aspects of the invention may be used with any suitable cartridge, or no cartridge at all, some cartridges may include features that enhance the operation of a beverage forming system 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod having opposed layers of permeable filter paper encapsulating a beverage material may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage material, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage material that is configured for use with a machine that forms coffee and/or tea beverages, however, aspects of the invention are not limited in this respect.

As used herein, "beverage" refers to a liquid substance intended for drinking that is formed when a liquid interacts with a beverage material, or a liquid that is dispensed without interacting with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage machine comprising:
   a liquid supply arranged to provide a liquid for forming a beverage;
   a dispensing station arranged to receive heated liquid for dispensing the beverage;
   a heater having an inlet to receive unheated liquid from the liquid supply, and an outlet arranged to provide the heated liquid to the dispensing station;
   an air supply arranged to provide air to the inlet of the heater; and
   a pump,
   wherein the pump is configured to pump the air and the unheated liquid to the inlet of the heater, wherein the heater is arranged to heat air received from the air supply and provide heated air to the dispensing station to preheat at least a portion of the dispensing station prior to providing the heated liquid to the dispensing station, and to subsequently provide the heated liquid to the dispensing station to form the beverage, wherein the pump is configured to pump the heated liquid to the dispensing station, and configured to pump the heated air to the dispensing station.

2. The machine of claim 1, further comprising a controller arranged to control the liquid supply, the air supply and the heater to cause the heater to provide heated air to the dispensing station and to subsequently provide heated liquid to the dispensing station.

3. The machine of claim 2, further comprising a temperature sensor arranged to detect a temperature of at least a portion of the heater, and wherein the controller is arranged to control the liquid supply, the air supply and the heater based on the temperature detected by the temperature sensor.

4. The machine of claim 3, wherein the controller is arranged to control the air supply and the heater to provide heated air to the dispensing station only if the temperature is below a threshold.

5. The machine of claim 2, wherein the controller is arranged to purge the heater of liquid after the heater provides heated liquid to the dispensing station.

6. The machine of claim 5, wherein the controller purges the heater of liquid by controlling the pump to pump air into the inlet of the heater.

7. The machine of claim 6, wherein the heater is a flow through heater including a fluid conduit in thermal communication with an electrical resistance heating element.

8. The machine of claim 1, wherein the heater is a flow through heater including a fluid conduit in thermal communication with an electrical resistance heating element.

9. The machine of claim 1, wherein the dispensing station includes a brew chamber arranged to hold a beverage material for mixing with the heated liquid to form the beverage.

10. A beverage machine comprising:
    a liquid supply arranged to provide a liquid for forming a beverage;
    a brew chamber arranged to hold a beverage material for mixing with the liquid to form the beverage;
    a heater having an inlet to receive liquid from the liquid supply, and an outlet arranged to provide heated liquid to the brew chamber;
    an air supply arranged to provide air to the inlet of the heater;
    a temperature sensor arranged to detect a temperature indicative of a brew chamber temperature; and
    a controller arranged to control the liquid supply, the air supply and the heater based on the temperature detected by the temperature sensor such that the controller is configured to cause the heater to provide heated air to the brew chamber prior to forming a beverage in response to the temperature detected by the temperature sensor being below a temperature threshold.

11. The machine of claim 10, wherein the controller is arranged to cause the heater to provide heated liquid to the brew chamber without providing heated air to the brew chamber in response to the temperature detected by the temperature sensor being above the temperature threshold.

12. The machine of claim 10, wherein the controller is arranged to cause the heater to provide heated liquid to the brew chamber to form the beverage after providing heated air to the brew chamber.

13. The machine of claim 10, wherein the liquid supply includes a pump and the liquid supply is arranged such that the pump selectively pumps liquid to inlet of the heater.

14. The machine of claim 13, wherein the pump is arranged to selectively pump liquid to the inlet of the heater, and to pump air to the inlet of the heater.

15. The machine of claim 10, wherein the air supply includes an air pump arranged to pump air into the inlet of the heater.

16. The machine of claim 10, wherein the temperature sensor is arranged to detect a temperature of at least a portion of the heater, and wherein the temperature of at least a portion of the heater represents the temperature at the brew chamber.

17. The machine of claim 10, wherein the controller is arranged to purge the heater of liquid after the heater provides heated liquid to the brew chamber.

18. The machine of claim 17, wherein the air supply includes an air pump arranged to pump air into the inlet of the heater, and the controller purges the heater of liquid by controlling the air pump to pump air into the inlet of the heater.

19. The machine of claim 18, wherein the heater is a flow through heater including a fluid conduit in thermal communication with an electrical resistance heating element.

20. The machine of claim 10, wherein the heater is a flow through heater including a fluid conduit in thermal communication with an electrical resistance heating element.

21. The machine of claim 1, further comprising one or more valves configured to selectively control whether the air or the unheated liquid is delivered to an inlet of the pump so that the air or the unheated liquid can be selectively provided to the inlet of the heater.

22. The machine of claim 10, wherein the temperature sensor is located at the brew chamber, wherein the temperature sensor is configured to measure the temperature at the brew chamber.

* * * * *